(12) United States Patent
Hu et al.

(10) Patent No.: US 12,095,311 B2
(45) Date of Patent: Sep. 17, 2024

(54) DIRECT STARTING SYNCHRONOUS RELUCTANCE MOTOR ROTOR AND MOTOR

(71) Applicant: GREE ELECTRIC APPLIANCES, INC. OF ZHUHAI, Zhuhai (CN)

(72) Inventors: Yusheng Hu, Zhuhai (CN); Bin Chen, Zhuhai (CN); Yong Xiao, Zhuhai (CN); Jinfei Shi, Zhuhai (CN); Qinhong Yu, Zhuhai (CN); Xia Li, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 412 days.

(21) Appl. No.: 17/605,470

(22) PCT Filed: Dec. 25, 2019

(86) PCT No.: PCT/CN2019/128234
§ 371 (c)(1),
(2) Date: Oct. 21, 2021

(87) PCT Pub. No.: WO2020/253198
PCT Pub. Date: Dec. 24, 2020

(65) Prior Publication Data
US 2022/0216747 A1    Jul. 7, 2022

(30) Foreign Application Priority Data

Jun. 19, 2019  (CN) .......................... 201910533174.7

(51) Int. Cl.
*H02K 1/24*    (2006.01)
*H02K 19/02*   (2006.01)
*H02K 29/03*   (2006.01)

(52) U.S. Cl.
CPC ............. *H02K 1/246* (2013.01); *H02K 19/02* (2013.01); *H02K 29/03* (2013.01); *H02K 2213/03* (2013.01)

(58) Field of Classification Search
CPC .... H02K 1/246; H02K 19/02; H02K 2213/03; H02K 29/03; H02K 1/22; H02K 1/26; H02K 19/14
See application file for complete search history.

(56) References Cited

U.S. PATENT DOCUMENTS

| 2,913,607 | A | * | 11/1959 | Douglas | ................. | H02K 19/14 |
| | | | | | | 310/216.107 |
| 4,139,790 | A | * | 2/1979 | Steen | ..................... | H02K 21/46 |
| | | | | | | 310/212 |

(Continued)

FOREIGN PATENT DOCUMENTS

| CN | 202384968 U | 8/2012 |
| CN | 205666745 U | 10/2016 |

(Continued)

OTHER PUBLICATIONS

WO-2018083639-A1, Cirullu, all pages (Year: 2018).*

(Continued)

*Primary Examiner* — Naishadh N Desai
(74) *Attorney, Agent, or Firm* — Oblon, McClelland, Maier & Neustadt, L.L.P.

(57) ABSTRACT

The present disclosure provides a direct starting synchronous reluctance motor rotor, and a motor. The direct starting synchronous reluctance motor rotor comprises: a rotor core provided with a plurality of slit grooves, two filling grooves are respectively disposed at two ends of each of the slit grooves to form a magnetic barrier layer, a first end of the filling groove being disposed adjacent to the slit groove, a second end of the filling groove being disposed to be extended outwards an outside of the rotor core, a beveled (Continued)

edge is disposed on the second end of at least one of the filling grooves away from a d-axis of the rotor core, so that a d-axis flux of the rotor core will not suddenly change when entering a stator along a channel formed at the beveled edge. With this arrangement, a reluctance torque ripple of the motor can be reduced, thereby reducing generated vibration noise, increasing a d-axis inductance and a flux difference between the d-axis and a q-axis, generating a greater reluctance torque, increasing an output torque of the motor with the rotor, and improving a motor efficiency.

19 Claims, 9 Drawing Sheets

(56) References Cited

U.S. PATENT DOCUMENTS

| | | | | |
|---|---|---|---|---|
| 5,831,367 | A | * | 11/1998 | Fei .................. H02K 1/246 |
| | | | | 310/216.107 |
| 2016/0336823 | A1 | * | 11/2016 | Kikuchi .................. H02K 1/246 |
| 2018/0358850 | A1 | * | 12/2018 | Hsu .................. H02K 3/12 |
| 2019/0109527 | A1 | | 4/2019 | Takahashi et al. |

FOREIGN PATENT DOCUMENTS

| | | |
|---|---|---|
| CN | 108768015 A | 11/2018 |
| CN | 109038883 A | 12/2018 |
| CN | 110138117 A | 8/2019 |
| CN | 110149015 A | 8/2019 |
| CN | 209805521 U | 12/2019 |
| JP | 2003-259615 A | 9/2003 |
| JP | 2003-333813 A | 11/2003 |
| KR | 10-2007-0007672 A | 1/2007 |
| WO | WO 2015/111625 A1 | 7/2015 |
| WO | WO-2018083639 A1 * 5/2018 ............. H02K 1/246 |

OTHER PUBLICATIONS

Extended European Search Report issued Jul. 21, 2022, in corresponding European Patent Application No. 19933656.1, 10 pages.
Office Action issued Aug. 1, 2023, in corresponding Japanese Patent Application No. 2021-559281 (with English Translation), 12 pages.
International Search Report issued Mar. 25, 2020 in PCT/CN2019/128234 filed Dec. 25, 2019, 3 pages.

* cited by examiner

DIRECT STARTING SYNCHRONOUS RELUCTANCE MOTOR ROTOR AND MOTOR

TECHNICAL FIELD

The present disclosure relates to a technical field of motor devices, and particularly to a direct starting synchronous reluctance motor rotor and a motor. The present disclosure claims priority of a patent application filed to the China National Intellectual Property Administration on Jun. 19, 2019, with an application number of 201910533174.7 and an invention title of 'Direct Starting Synchronous Reluctance Motor Rotor and Motor'.

BACKGROUND

A direct starting synchronous reluctance motor combines structural characteristics of an induction motor and a synchronous reluctance motor, thereby realizing a start by generating a torque through a squirrel cage induction, carrying out a constant-speed running by generating a reluctance torque through a rotor inductance gap, and achieving a start and running by directly introducing power. Compared with a direct starting permanent magnet motor, the direct starting synchronous reluctance motor has no rare earth permanent magnet material or demagnetization, with a low cost and a good reliability. Compared with an asynchronous motor, the direct starting synchronous reluctance motor has a high efficiency and a constant speed. When the direct starting synchronous reluctance motor is started, the working principle is similar to that of the asynchronous motor, and it is started by an asynchronous torque. When a synchronous speed is reached, the asynchronous torque is 0. At this time, the working principle is the same as that of the reluctance motor, and the running is carried out synchronously through the reluctance torque.

The traditional synchronous reluctance motor needs a driver for a start and running control, so the cost is high and the control is difficult. In addition, the driver causes a certain loss, and decreases the efficiency of the whole motor system. In the related art, a patent with a patent publication number CN106537740A provides a rotor, a reluctance machine and a method for manufacturing the rotor, wherein a filling material of a flux barrier of the rotor reaches a rotor periphery and forms a part of the rotor periphery; and machining is required after the material is filled in the flux barrier, which leads to a long manufacturing time, a low efficiency and a high manufacturing cost. Moreover, the motor has large torque ripple and much vibration noise. A patent with a patent publication number CN207320974U provides a self-starting synchronous reluctance motor with a rotor core of an asymmetric structure to reduce the torque ripple, thereby suppressing or reducing electromagnetic noise and electromagnetic vibrations caused by the torque ripple. However, a new electromagnetic force will be introduced due to the asymmetric structure, resulting in new electromagnetic noise. In the related art, it is difficult to realize a synchronous design with a high efficiency, low noise and a high starting capability at the same time, and the related art often has some defects.

SUMMARY

A main objective of the present disclosure is to provide a direct starting synchronous reluctance motor rotor and a motor, to solve the problem of large vibration noise in the related art, and improve a reluctance torque, an efficiency and a starting capability of the motor.

In order to achieve the above objective, according to an aspect of the present disclosure, there is provided a direct starting synchronous reluctance motor rotor, comprising: a rotor core provided with a plurality of slit grooves, two filling grooves are respectively disposed at two ends of each of the slit grooves to form a magnetic barrier layer, a first end of the filling groove being disposed adjacent to the slit groove, a second end of the filling groove being disposed to be extended outwards an outside of the rotor core, a beveled edge disposed on the second end of at least one of the filling grooves away from a d-axis of the rotor core being provided with so that a d-axis flux of the rotor core will not suddenly change when entering a stator along a channel formed at the beveled edge.

Further, an included angle θ is between a sidewall of the filling groove away from the d-axis and the beveled edge, wherein 125°≤θ≤165°.

Further, 145°≤θ≤155°.

Further, the second end of each of the filling grooves is provided with the beveled edge, or the second end of each of the filling grooves disposed at intervals is provided with the beveled edge.

Further, a distance from a first end to a second end of the beveled edge is k, and a width of the filling groove is w, wherein 0.3w≤k<w.

Further, the angles θ are gradually increased in a direction away from the d-axis.

Further, the plurality of slit grooves and the filling grooves are formed by combinations of linear sections and circular arc sections.

Further, the second end of the filling groove is extended outwards an outside of the rotor core, and at least a part of the second end of the filling groove is communicated with an outer periphery of the rotor to form an open groove.

Further, a width of the open groove is m, wherein 0.1w≤m≤0.7w.

Further, the filling groove is disposed at an included angle with the adjacent slit groove, and a magnetic conduction channel formed between adjacent two of the filling grooves is disposed parallel with or at an included angle with the d-axis.

Further, lengths of the filling groove are gradually increased in a direction close to the d-axis.

Further, distances between adjacent two of the filling grooves are gradually decreased in the direction away from the d-axis.

Further, widths of the slit groove are gradually decreased outward in the radial direction of the rotor core.

Further, lengths of the slit grooves are gradually decreased outward in the radial direction of the rotor core.

Further, a width of a magnetic conduction channel formed between adjacent two of the slit grooves is gradually decreased outward in the radial direction of the rotor core.

Further, the filling groove is filled with a conductive and magnetic-insulation material, which forms a squirrel cage together with conductive end rings at both ends of the rotor core.

Further, the conductive and magnetic-insulation material filled in the filling groove is the same as a material of the conductive end ring, and preferably, aluminum or aluminum alloy.

Further, a ratio of a filling area of the conductive and magnetic-insulation material to a total area of all of the filling grooves and the slit grooves is Q2, wherein 0.3≤Q2≤0.7.

Further, a plurality of independent filling grooves are further disposed at an outer edge of the rotor core at any magnetic pole, a reinforcing rib is formed between the adjacent independent filling grooves, and a width of the reinforcing rib is L, wherein $0.5\sigma \leq L < \sigma$, and $\sigma$ is an air gap width between the stator and the rotor core.

Further, a ratio of a sum of a total width of all of the slit grooves in a q-axis and a width of the independent filling groove in the q-axis to an effective core width in the radial direction of the rotor core is Q1, wherein $0.35 \leq Q1 \leq 0.5$.

Further, a first reinforcing rib is disposed between the filling groove and the slit groove in a same magnetic barrier layer, and a second reinforcing rib is disposed between the filling groove and an outer edge of the rotor core.

Further, a width of at least one of the first reinforcing rib and the second reinforcing rib is L4, wherein $0.8\sigma \leq L4 \leq 3\sigma$.

Further, the plurality of independent filling grooves are disposed at intervals in a peripheral direction of the rotor core, and occupy a central angle $\alpha$ of the rotor core, wherein $0.1\tau \leq \alpha \leq 0.4\tau$, wherein $\tau$ is a pole pitch angle, $\tau = 180°/p$, and p is the number of pole-pairs.

Further, there are at least two of the magnetic barrier layers formed by the slit grooves and the filling grooves at both ends thereof.

According to another aspect of the present disclosure, there is provided a motor, comprising the direct starting synchronous reluctance motor rotor aforementioned.

According to the technical solutions of the present disclosure, the beveled edge is disposed on the second end of the filling groove away from the rotor core, so that a d-axis flux of the rotor core will not suddenly change when entering a stator along a channel formed at the beveled edge. With this arrangement, a reluctance torque ripple of the motor can be reduced, thereby reducing generated vibration noise, increasing a d-axis inductance and a flux difference between the d-axis and a q-axis, generating a greater reluctance torque, increasing an output torque of the motor with the rotor, and improving a motor efficiency.

BRIEF DESCRIPTION OF THE DRAWINGS

The drawings of the specification, which constitute a part of the present disclosure, are used to provide a further understanding of the present disclosure. The illustrative embodiments and the descriptions thereof are used to explain the present disclosure, rather than constituting improper limitations thereto. In which.

Figure 1:
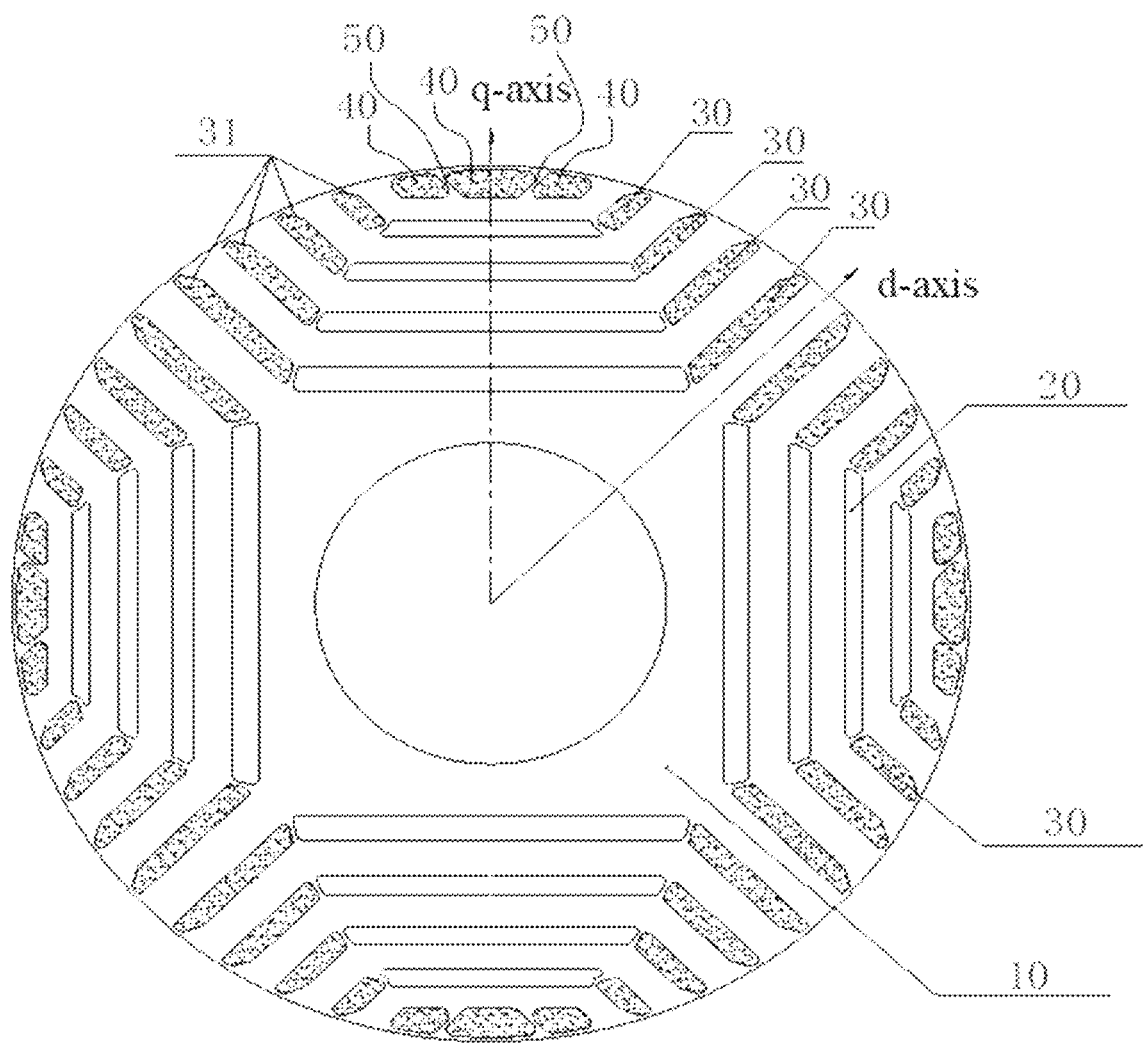
FIG. 1 illustrates a structural diagram of a first embodiment of a direct starting synchronous reluctance motor rotor according to the present disclosure.

In which, the above drawings include the following reference numerals:

10: rotor core;
20: slit groove;
30: filling groove;
31: beveled edge;
40: independent filling groove;
50: reinforcing rib;
60: conductive end ring.

DETAILED DESCRIPTION

It should be noted that the embodiments of the present disclosure and the features in the embodiments may be combined with each other if there is no conflict. The present disclosure will be described in detail as follows with reference to the drawings and in conjunction with the embodiments.

It should be noted that the terms used here are only for describing the specific embodiments, and are not intended to limit the exemplary embodiments according to the present disclosure. As used here, unless otherwise specified explicitly in the context, a singular form is also intended to include a plural form. In addition, it should be understood that when a term 'comprise' and/or 'include' is used in this specification, it indicates the presence of features, steps, operations, devices, components and/or combinations thereof.

It should be noted that the terms 'first', 'second', etc. in the Description, claims and drawings of the present disclosure are used to distinguish similar objects, rather than necessarily describing a specific order or sequence. It should be understood that the terms so used are interchangeable under appropriate circumstances, so that the embodiments of the present disclosure described here can be embodied, for example, in an order other than those illustrated or described here. In addition, the terms 'include' and 'have' and any variations thereof are intended to cover non-exclusive inclusions. For example, for a process, method, system, product or device including a series of steps or units, it is unnecessary to explicitly list those steps or units, and other steps or units not explicitly listed or inherent to the process, method, product or device may also be included.

For the convenience of description, spatial relative terms, such as 'on', 'above', 'on an upper surface of', 'over', etc., may be used to describe a spatial positional relationship between one device or feature and any other device or feature as illustrated in the drawings. It should be understood that spatial relative terms are intended to encompass different orientations in use or operation in addition to those of a device depicted in the drawings. For example, if a device in the drawings are inverted, the device described as being 'above other device or construction' or 'on other device or construction' will be positioned as being 'below other device or construction' or 'under other device or construction'. Therefore, the exemplary term 'above' may include two orientations, i.e., 'above' and 'below'. The device may also be positioned in other different ways (being rotated 90 for degrees or in other orientations), and the spatial relative description used here will be explained accordingly.

Now, the exemplary embodiments according to the present disclosure will be described more detailedly with reference to the drawings. However, these exemplary embodiments may be embodied in many different forms, and should not be interpreted as being limited to the embodiments set forth here. It should be understood that these embodiments are provided in order to make the content of the present disclosure thorough and complete, and fully convey the concepts of these exemplary embodiments to those of ordinary skill in the art. In the drawings, it is possible to enlarge the thicknesses of layers and areas for clarity, and the same reference numerals are used to denote the same devices, so the descriptions thereof will be omitted.

Referring to FIGS. 1 to 3, 4b and 5, an embodiment according to the present disclosure provides a direct starting synchronous reluctance motor rotor.

Specifically, as illustrated in FIG. 1, the rotor comprises a rotor core 10 provided with a plurality of slit grooves 20. two filling groove 30 are respectively disposed on two ends of each of the slit grooves 20 to form a magnetic barrier layer, and a first end of the filling groove 30 is disposed adjacent to the slit groove 20. A second end of the filling groove 30 is disposed to be extended outwards an outside of the rotor core 10. A beveled edge 31 is disposed on the second end of at least one of the filling grooves 30 away from a d-axis of the rotor core 10, so that a d-axis flux of the rotor core 10 will not suddenly change when entering a stator along a channel formed at the beveled edge 31.

Figure 2:
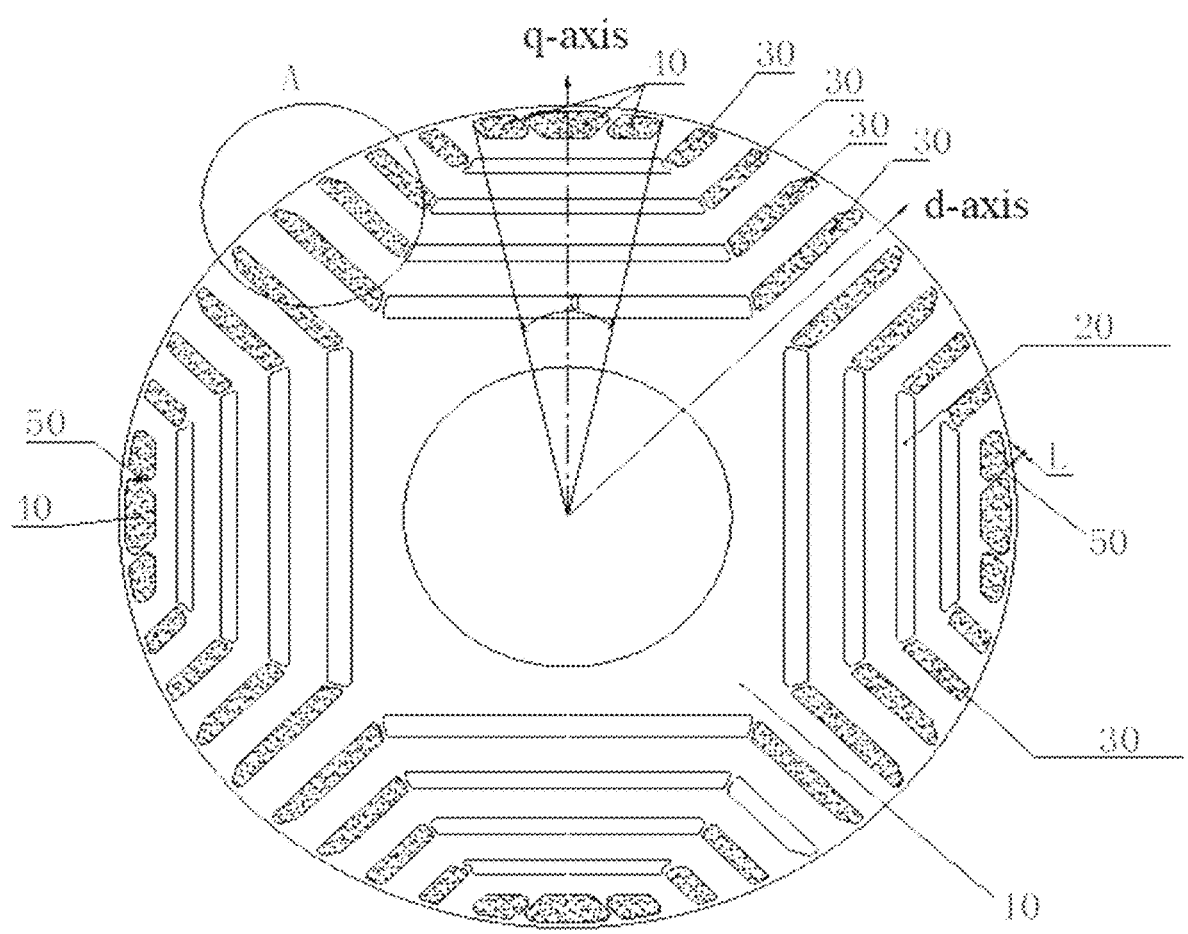
FIG. 2 illustrates a structural diagram of a second embodiment of a direct starting synchronous reluctance motor rotor according to the present disclosure.
Figure 3:
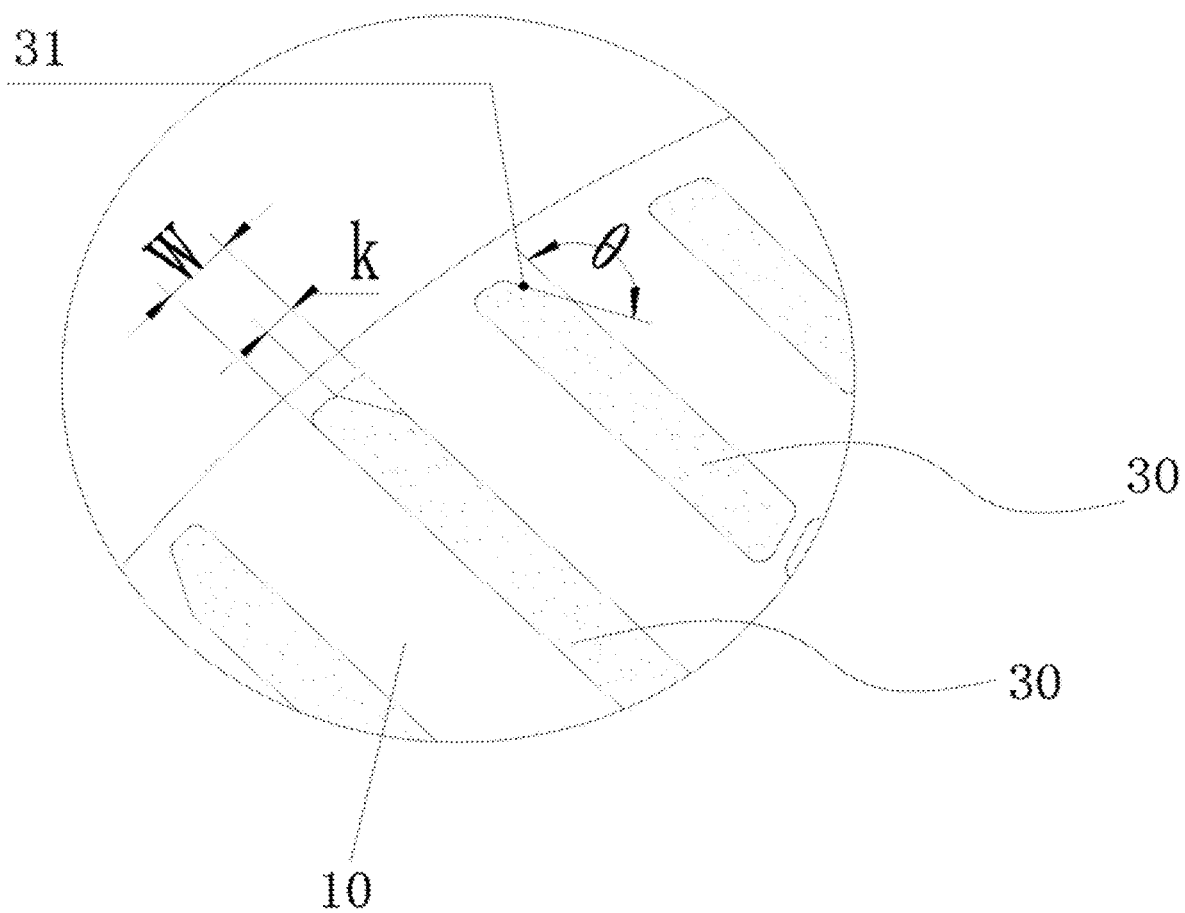
FIG. 3 illustrates an enlarged structural diagram of portion A in FIG. 2.
Figure 4A:
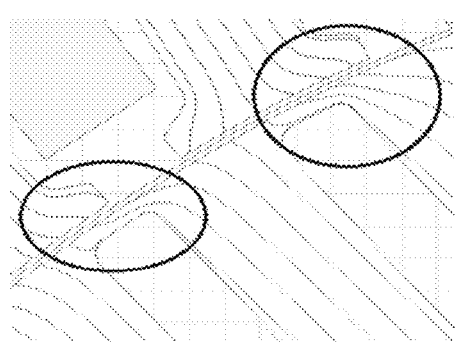
FIG. 4a illustrates a schematic diagram of a magnetic circuit for a filling groove without a beveled edge in the related art.
Figure 7:
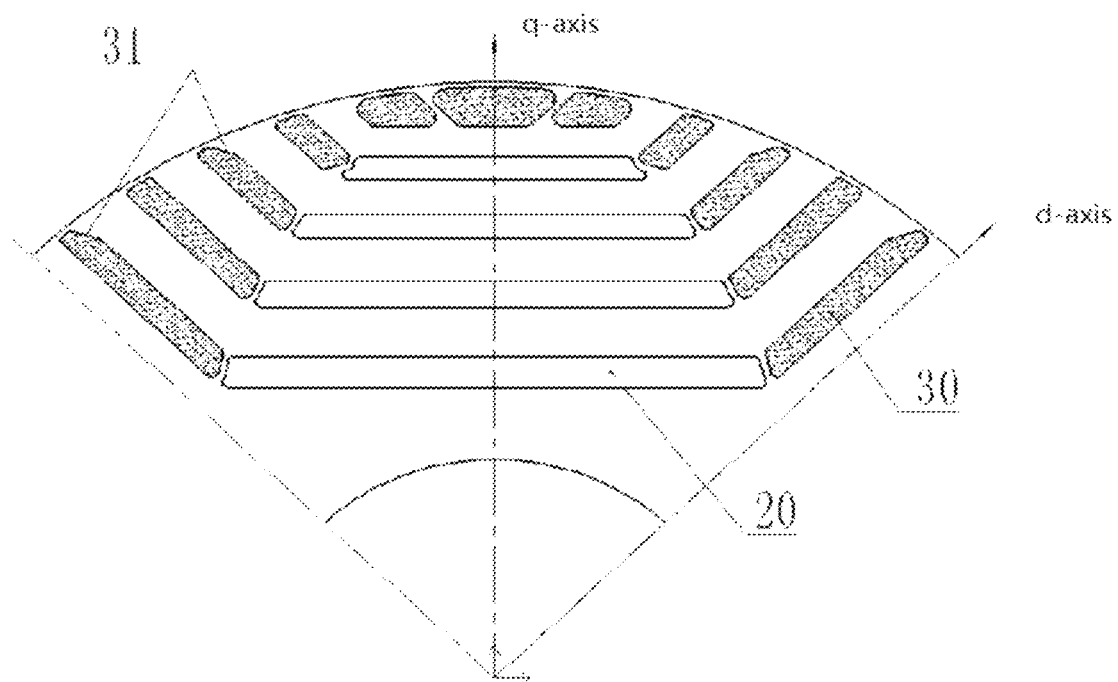
FIG. 7 illustrates a structural diagram of a third embodiment of a direct starting synchronous reluctance motor rotor according to the present disclosure.

In this embodiment, a beveled edge 31 is disposed on the second end of the filling groove 30 away from a d-axis of the rotor core 10, so that a d-axis flux of the rotor core 10 will not suddenly change when entering a stator along a channel formed at the beveled edge 31. With this arrangement, the reluctance torque ripple of the motor can be reduced, thereby reducing generated vibration noise, increasing a d-axis inductance and a flux difference between the d-axis and a q-axis, generating a greater reluctance torque, increasing an output torque of the motor with the rotor, and improving a motor efficiency. In which, FIG. 4a illustrates a schematic diagram of a magnetic circuit without a beveled edge in the related art. As illustrated in FIG. 2, beveled edges are provided on four adjacent filling grooves 30 in one pole. Of course, each of the filling grooves may be provided with a beveled edge as illustrated in FIG. 1, or the beveled edges may be disposed at intervals (as illustrated in FIG. 7) or arbitrarily.

In which, an included angle θ is between a sidewall of the filling groove 30 away from the d-axis and the beveled edge 31, wherein 125°≤θ≤165°. Preferably, the included angle satisfies: 145°≤θ≤155°. A distance from a first end to a second end of the beveled edge 31 is k, and a width of the filling groove 30 is w, wherein 0.3w≤k<w. The angles θ are gradually increased in a direction away from the d-axis. By disposing the beveled edge 31, the reluctance sudden change and the reluctance torque ripple of the motor can be reduced, while the d-axis inductance entering the stator can be increased.

Figure 9:
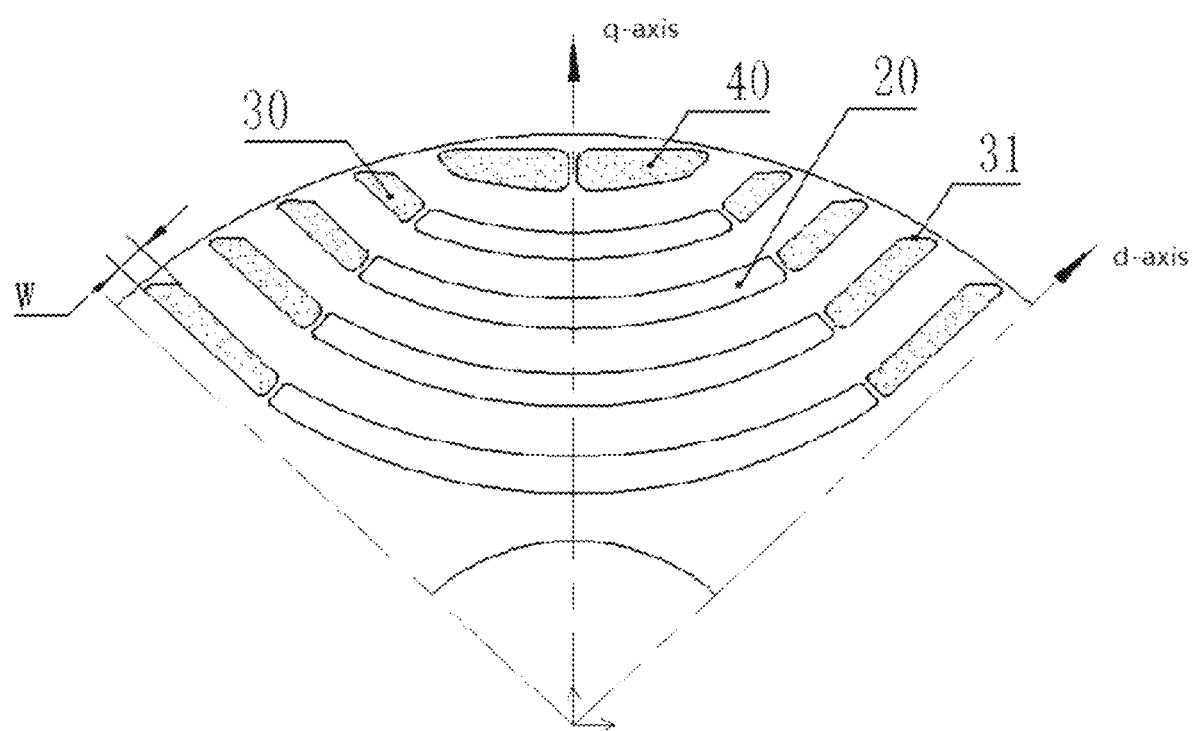
FIG. 9 illustrates a structural diagram of a fifth embodiment of a direct starting synchronous reluctance motor rotor according to the present disclosure.
Figure 11:
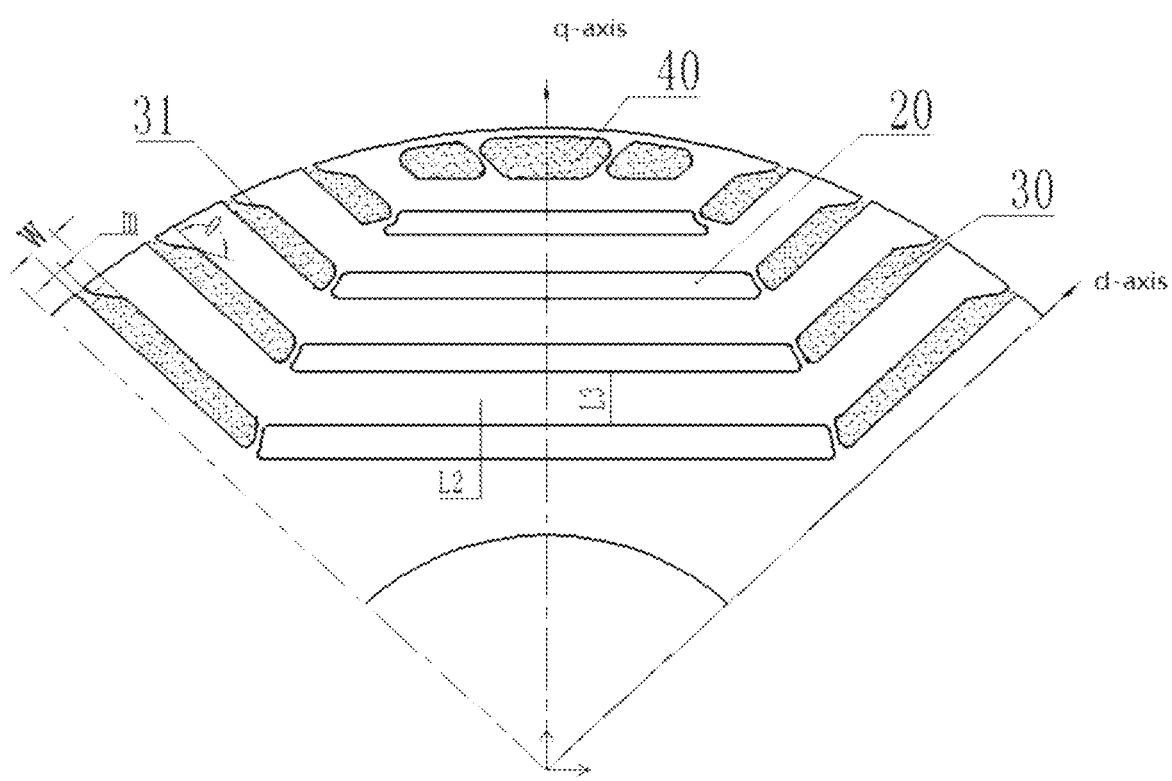
FIG. 11 illustrates a structural diagram of a sixth embodiment of a direct starting synchronous reluctance motor rotor according to the present disclosure.

The plurality of slit grooves 20 and filling grooves 30 may be linear sections, circular arc sections, and combinations of various shapes, as illustrated in FIG. 9. The second end of the filling groove 30 is extended outwards an outside of the rotor core 10, and at least a part of the second end of the filling groove 30 is communicated with an outer periphery of the rotor to form an open groove, as illustrated in FIG. 11, and a width m of the open groove satisfies 0.1w≤m≤0.7w. The open groove can reduce the q-axis inductance, improve the motor reluctance torque and the motor efficiency. Each of the filling grooves 30 is disposed at an included angle with the adjacent slit groove 20, and a magnetic conduction channel formed between adjacent two of the filling grooves 30 is disposed parallel with or at an included angle with the d-axis, wherein the included angle is small so that the magnetic conduction channel is substantially parallel with the d-axis. Lengths of the filling groove 30 are gradually increased in a direction close to the d-axis. Distances between adjacent two of the filling grooves 30 is gradually decreased in the direction away from the d-axis. The motor efficiency is effectively increased and the motor starting capability is improved.

Figure 10:
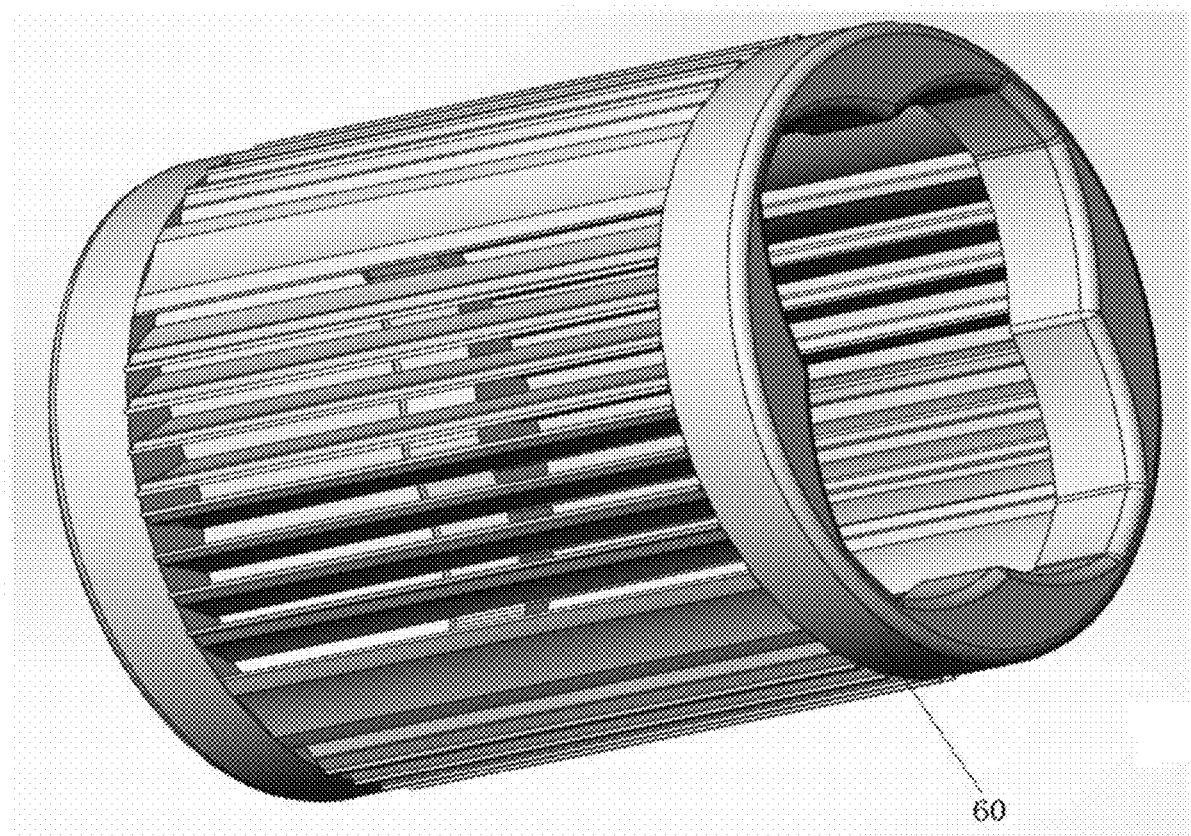
FIG. 10 illustrates a schematic diagram of a squirrel cage of a direct starting synchronous reluctance motor rotor according to the present disclosure.

Further, the width of the slit groove 20 is gradually decreased outward in the radial direction of the rotor core 10. A ratio of a sum of a total width of all of the slit grooves 20 in the q-axis and a width of the independent filling groove 40 in the q-axis to an effective core width in the radial direction of the rotor core 10 is Q1, wherein 0.35≤Q1≤0.5. The length of the slit groove 20 is gradually decreased outward in the radial direction of the rotor core 10, and the width of the magnetic conduction channel formed between adjacent two of the slit groove 20 is gradually decreased outward in the radial direction of the rotor core 10. In which, the filling groove 30 is filled with a conductive and magnetic-insulation material, which forms a squirrel cage together with conductive end rings 60 at both ends of the rotor core 10, as illustrated in FIG. 10. The conductive and magnetic-insulation material filled in the filling groove 30 is the same as the material of the conductive end ring, and preferably, may be aluminum or aluminum alloy. A ratio of a filling area of the conductive magnetic-insulation material to a total area of all of the filling grooves 30 and the slit grooves 20 is 0.3 to 0.7, and preferably, the ratio is 0.4 to 0.6. This arrangement can further improve the efficiency of the motor with the rotor, the squirrel cage can help the motor start, and a proper filling area can improve the motor starting capability. In which, the effective core width is a width from an inner circle to an outer circle of the rotor core.

Figure 8:
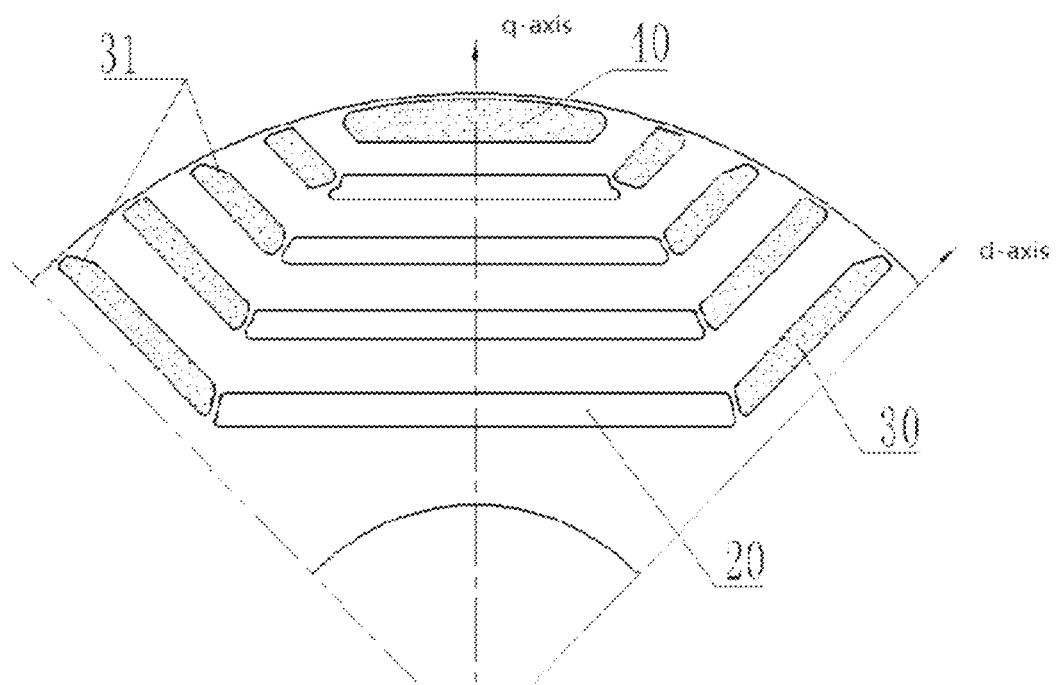
FIG. 8 illustrates a structural diagram of a fourth embodiment of a direct starting synchronous reluctance motor rotor according to the present disclosure.

A plurality of independent filling grooves 40 are further disposed at an outer edge of the rotor core 10 at any magnetic pole, a reinforcing rib 50 is formed between the adjacent independent filling grooves 40, and a width of the reinforcing rib 50 is L, wherein 0.5σ≤L<σ, and σ is an air gap width between the stator and the rotor core 10. This arrangement can effectively reduce the torque ripple of the motor. As illustrated in FIG. 1, there are three independent filling grooves 40, among which two reinforcing ribs 50 are disposed to be splayed and symmetrical with respect to the q-axis. A plurality of independent filling grooves 40 may also be communicated into a whole, as illustrated in FIG. 8, to increase the motor starting capability.

In which, as illustrated in FIG. 2, a plurality of independent filling grooves 40 are disposed at intervals in a peripheral direction of the rotor core 10, and occupy a central angle α of the rotor core 10, wherein 0.1τ≤α≤0.4τ, wherein τ is a pole pitch angle, τ=180°/p, and p is the number of pole-pairs. This arrangement can effectively improve the motor efficiency and ensure the motor starting capability.

Further, a first reinforcing rib is disposed between the filling groove 30 and the slit groove 20 in a same magnetic barrier layer, and a second reinforcing rib is disposed between the filling groove 30 and the outer periphery of the rotor. The width of the reinforcing rib is L4, wherein $0.8\sigma \leq L4 \leq 3\sigma$. Therefore, the structural strength of the rotor is ensured, and the magnetic leakage is reduced as much as possible to improve the motor efficiency.

Preferably, there are at least two of the magnetic barrier layers formed by the slit grooves 20 and the filling grooves 30 at both ends thereof. Four magnetic barrier layers are illustrated in FIGS. 1 and 2.

The rotor in the above embodiment may be applied in the technical field of motor devices, that is, a motor is provided according to another aspect of the present disclosure. The motor comprises the direct starting synchronous reluctance motor rotor aforementioned.

Specifically, in the direct starting synchronous reluctance motor rotor of the present disclosure, the beveled edges are disposed on the ends of the filling groove to reduce the reluctance sudden change and the reluctance torque ripple of the motor, thereby reducing the generated vibration noise. By disposing the beveled edges, the d-axis inductance entering the stator can be increased, thereby increasing the output torque of the motor.

By optimizing the design of the beveled edges at the ends of the filling groove, the reluctance torque ripple of the motor can be reduced, thereby reducing generated vibration noise, increasing a d-axis inductance and a flux difference between the d-axis and a q-axis, generating a greater reluctance torque, increasing an output torque of the motor, and improving a motor efficiency. In which, an angle θ between an edge of the beveled edge and an edge of the corresponding filling groove satisfies $125° \leq \theta \leq 165°$, preferably $145° \leq \theta \leq 155°$, and a proper angle range is selected to ensure the effect of the beveled edge. Further, distances between adjacent two of the filling grooves are L1, which are gradually decreased in a direction away from the d-axis. A width of the slit groove is L2, which is gradually decreased in a direction away from a center of the rotor core. A width of the magnetic channel formed between adjacent two of the slit grooves is L3, which is gradually decreased in the direction away from the center of the rotor core. The magnetic channel close to a rotor center has a strong magnetic field strength, and the magnetic channel is designed to be wide to avoid the influence of magnetic field saturation on the output and efficiency of the motor.

The slit groove and the corresponding filling groove are combined to form a magnetic barrier layer, and each of the filling grooves is filled with a conductive and magnetic-insulation material, and preferably aluminum or aluminum alloy, so as to realize an asynchronous start of the motor. The magnetic barrier layer produces an inductance difference between the d-axis and the q-axis, and produces a reluctance torque to maintain the synchronous running of the motor. The filling grooves in the q-axis direction are composed of a plurality of filling grooves which are divided separately, and a width of the rib therebetween is L, wherein $0.5\sigma \leq L < \sigma$, and σ is an air gap width between the stator core and the rotor core. The filling grooves are divided by the rib, and the width of the rib is smaller than the width of the air gap. By the filling grooves and the ribs, the ripple caused by the interaction with the stator and the vibration noise of the motor are reduced.

An angle α is occupied by the filling groove in the q-axis direction, i.e., the independent filling groove, relative to the rotor center, where $0.1\tau \leq \alpha \leq 0.4\tau$, wherein τ is a polar pitch angle, i.e., $\tau = 180°/p$, and p is number of pole-pairs. Preferably, $0.25\tau \leq \alpha \leq 0.35\tau$. For this embodiment, p is 2 and $\tau = 90°$, so $9° \leq \alpha \leq 36°$, and preferably $22.5° \leq \alpha \leq 31.5°$. Therefore, the filling groove may serve as a magnetic barrier layer to further increase the d-axis reluctance and reduce the d-axis flux, and may also serve as a starting squirrel cage to improve the starting performance of the motor. The filling grooves and the slit grooves are disposed in pairs on the rotor circumference, and there are at least two of the magnetic barrier layers formed by the filling grooves and the slit grooves in the radial direction of the rotor core.

Figure 4B:
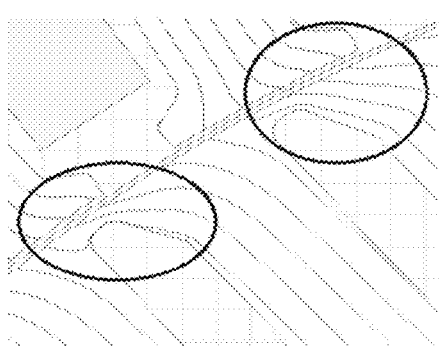
FIG. 4b illustrates a schematic diagram of a magnetic circuit for a filling groove with a beveled edge in a direct starting synchronous reluctance motor rotor according to the present disclosure.

A width k of the beveled edge is less than a width w of the end of the corresponding filling groove. Preferably, $0.3w \leq k \leq 0.7w$. By setting a proper width of the beveled edge, it can ensure the effectiveness of the beveled edge and reduce the magnetic leakage. FIGS. 4b and 4a are comparison diagrams of the influences with the beveled edge and without the beveled edge on the magnetic field distribution of the motor in the present disclosure. After the beveled edge is disposed, the magnetic field may gradually transition into the stator through a notch, thereby avoiding the sudden change of the magnetic field, reducing the peak value of the electromagnetic torque and achieving the purpose of reducing the torque ripple. Meanwhile, the notch increases the width of the magnetic channel, the d-axis magnetic field entering the stator, and the d-axis inductance, thereby ensuring the output torque of the motor.

In which, an extending direction of the filling grooves at both ends of the slit groove is substantially parallel with the d-axis, so that the d-axis flux can flow smoothly in the d-axis direction. As the filling groove becomes closer to the corresponding d-axis, an extending length in the d-axis direction and the area of the filling groove increase. On the contrary, as the filling groove is farther from the corresponding d-axis, the extending length in the d-axis direction and the area of the filling groove decrease. The deep and narrow filling grooves have a skin effect, and the unequal filling grooves increase a pull-in torque in the starting process, which is helpful to improve the starting performance of the motor.

Figure 5:
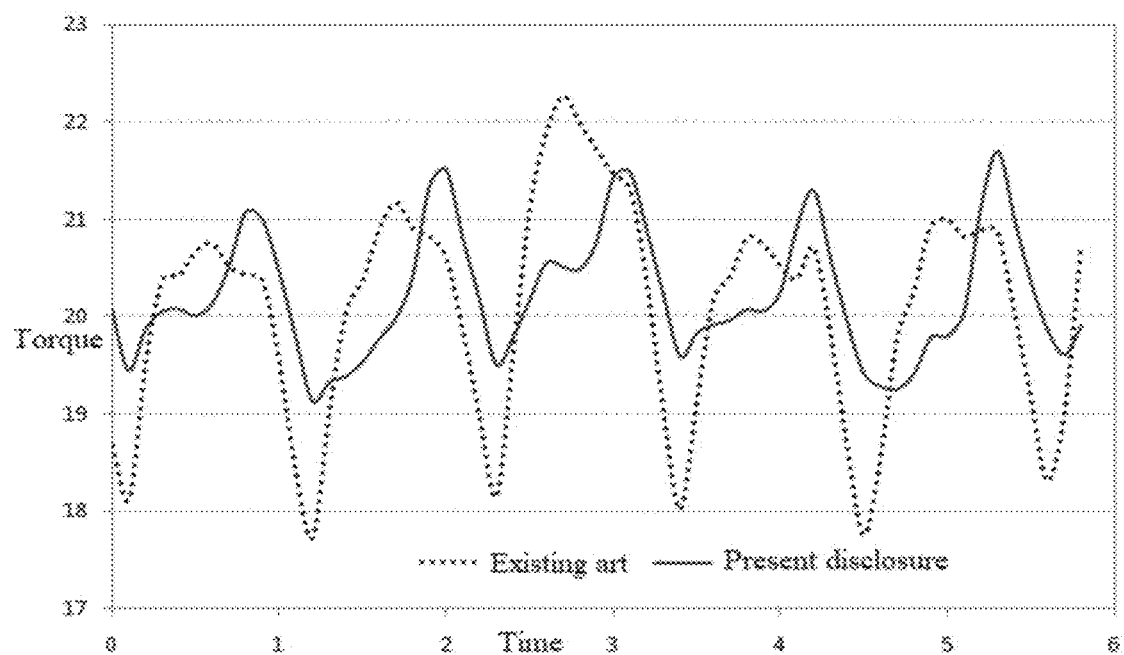
FIG. 5 illustrates a comparison diagram of motor torque curves in the present disclosure and in the related art.

Further, the filling grooves and the slit grooves are disposed in pairs on the rotor circumference. There are at least two of the magnetic barrier layers formed by the filling grooves and the slit grooves in the radial direction of the rotor core, thereby forming paired poles and a plurality layers of magnetic barriers to increase the inductance gap and the reluctance torque;

FIG. 5 illustrates a comparison diagram of motor torque curves in the technology of the present disclosure and in the related art. It can be seen that by adopting the technical solution of the present disclosure, the torque ripple of the motor is reduced by about half, while the average torque of the motor is not reduced, thereby achieving a good technical effect, which is helpful to reduce the generated vibration noise of the motor. In which, the filling groove and the slit groove are not limited to straight-shaped, and may be arc-shaped.

Figure 6:
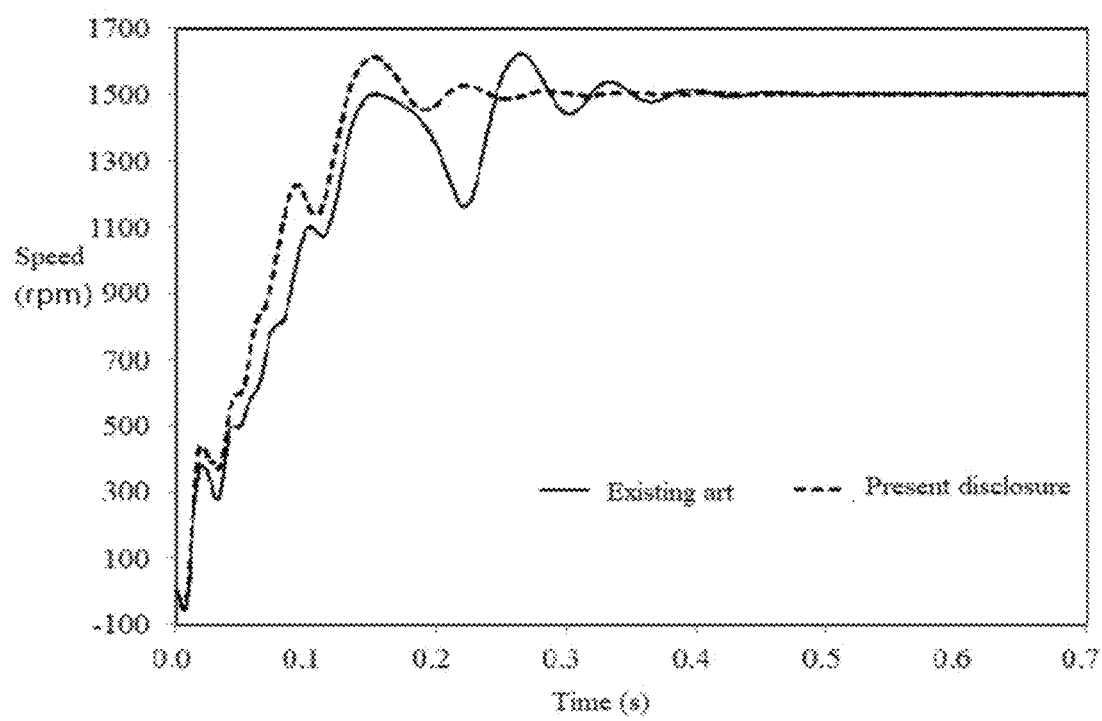
FIG. 6 illustrates a comparison diagram of speed curves of motor starting processes in the present disclosure and in the related art.
Figure 12:
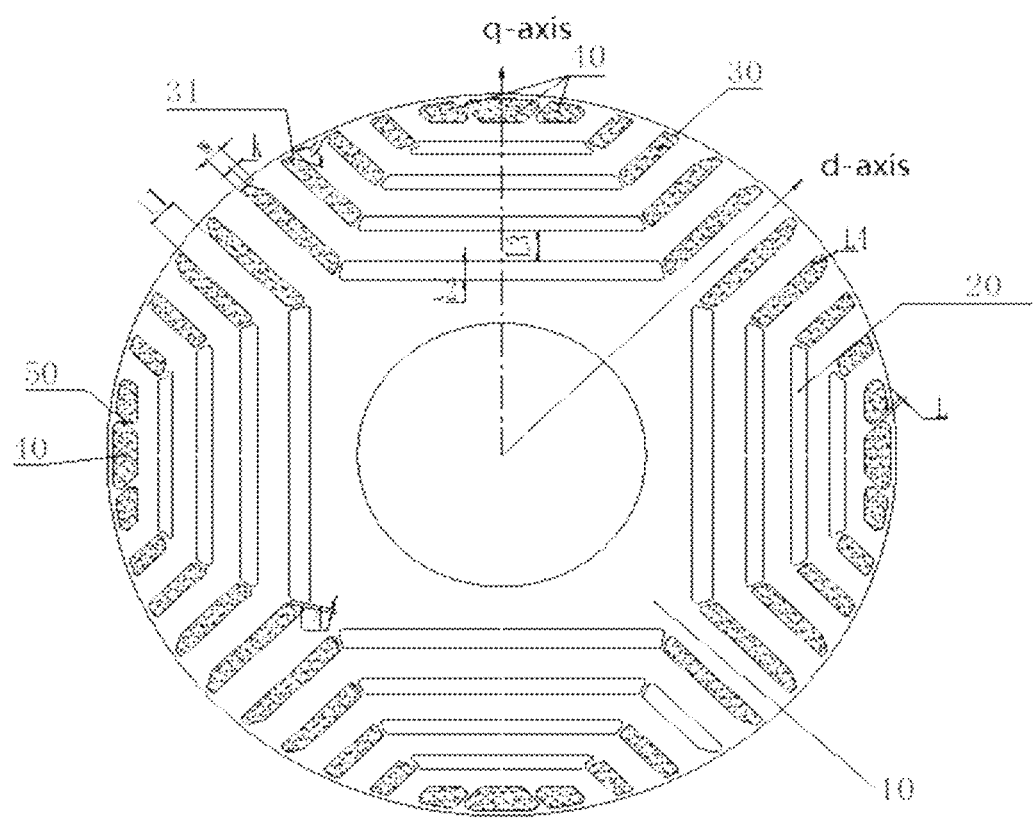
FIG. 12 illustrates a structural diagram of a sixth embodiment of a direct starting synchronous reluctance motor rotor according to the present disclosure.

FIG. 6 illustrates a comparison diagram of speed curves in motor starting processes in the technology of the present disclosure and in the related art. It can be seen that the starting speed of the motor in the present disclosure is faster, the starting and stabilizing time is shorter, and the starting capability is stronger. As illustrated in FIG. 12, L is a width of a reinforcing rib 50, L1 is a width of a magnetic conduction channel formed between adjacent two of the filling grooves, L2 is a width of a slit groove, L3 is a width of a magnetic conduction channel formed between adjacent two of the slit grooves, and L4 is a width of a first reinforcing rib or a second reinforcing rib. In this embodiment, the width of the first reinforcing rib may be the same as or different from that of the second reinforcing rib.

In addition, it should be further noted that 'one embodiment', 'another embodiment' and 'an embodiment' mentioned in this specification mean that the specific features, structures or characteristics described in conjunction with this embodiment are included in at least one embodiment generally described in the present disclosure. The same expression appearing in several places in the specification does not necessarily refer to a same embodiment. Further, when a specific feature, structure or characteristic is described in conjunction with any embodiment, it is claimed that the implementation of the feature, structure or characteristic in conjunction with any other embodiment should fall within the scope of the present disclosure.

The description of each embodiment has its own emphasis. For a portion that is not detailed in one embodiment, please refer to the relevant descriptions in other embodiments.

Those described above are just preferred embodiments of the present disclosure, rather than limitations thereto. For persons skilled in the art, various modifications and changes can be made to the present disclosure. Any modification, equivalent substitution, improvement, etc. made within the spirit and principle of the present disclosure should fall within the protection scope of the present disclosure.

The invention claimed is:

1. A direct starting synchronous reluctance motor rotor, comprising:
   a rotor core provided with a plurality of slit grooves;
   two filling grooves respectively disposed adjacent to two ends of each of the slit grooves to form a magnetic barrier layer; and
   wherein a first end of a filling groove being disposed adjacent to a slit groove, a second end of the filling groove being disposed to be extended outwards an outside of the rotor core, an extending direction of the filling groove substantially parallel with a d-axis, a beveled edge disposed on the second end of at least one of the filling grooves away from a d-axis of the rotor core, so that a d-axis flux of the rotor core does not suddenly change when entering a stator along a channel formed at the beveled edge,
   wherein lengths of the filling grooves are gradually increased in a direction close to the d-axis, and
   wherein distances between adjacent two of the filling grooves are gradually decreased in the direction away from the d-axis.

2. The direct starting synchronous reluctance motor rotor according to claim 1, wherein an included angle $\theta$ is between a sidewall of the filling groove away from the d-axis and the beveled edge, wherein $125° \leq \theta \leq 165°$.

3. The direct starting synchronous reluctance motor rotor according to claim 2, wherein $145° \leq \theta \leq 155°$.

4. The direct starting synchronous reluctance motor rotor according to claim 1, wherein the beveled edge is disposed on the second end of each of the filling grooves, or the beveled edge is disposed on the second end of each of the filling grooves disposed at intervals.

5. The direct starting synchronous reluctance motor rotor according to claim 1, wherein a distance from a first end to a second end of the beveled edge is k, and a width of the filling groove is w, wherein $0.3w \leq k \leq w$.

6. The direct starting synchronous reluctance motor rotor according to claim 2, wherein the angles $\theta$ are gradually increased in a direction away from the d-axis.

7. The direct starting synchronous reluctance motor rotor according to claim 1, wherein the plurality of slit grooves and the filling grooves are formed by combinations of linear sections and circular arc sections.

8. The direct starting synchronous reluctance motor rotor according to claim 1, wherein at least a part of the second end of the filling groove is communicated with an outer periphery of the rotor to form an open groove.

9. The direct starting synchronous reluctance motor rotor according to claim 8, wherein a width of the open groove is m, wherein $0.1w \leq m \leq 0.7w$.

10. The direct starting synchronous reluctance motor rotor according to claim 1, wherein the filling groove is disposed at an included angle with the adjacent slit groove, and a magnetic conduction channel formed between adjacent two of the filling grooves is disposed parallel with the d-axis.

11. The direct starting synchronous reluctance motor rotor according to claim 1, wherein widths of the slit grooves are gradually decreased outward in a radial direction of the rotor core; and
    wherein lengths of the slit groove are gradually decreased outward in the radial direction of the rotor core.

12. The direct starting synchronous reluctance motor rotor according to claim 1, wherein widths of magnetic conduction channels formed between adjacent two of the slit grooves are gradually decreased outward in a radial direction of the rotor core.

13. The direct starting synchronous reluctance motor rotor according to claim 1, wherein the filling groove is filled with a conductive and magnetic-insulation material, which forms a squirrel cage together with conductive end rings at both ends of the rotor core; and
    wherein the conductive and magnetic-insulation material filled in the filling groove is the same as a material of the conductive end ring, and preferably, aluminum or aluminum alloy.

14. The direct starting synchronous reluctance motor rotor according to claim 1, wherein a ratio of a filling area of the conductive and magnetic-insulation material to a total area of all of the filling grooves and the slit grooves is Q2, wherein $0.3 \leq Q2 \leq 0.7$.

15. The direct starting synchronous reluctance motor rotor according to claim 1, wherein a plurality of independent filling grooves are further disposed at an outer edge of the rotor core at each magnetic pole, a reinforcing rib is formed between adjacent independent filling grooves, and a width of the reinforcing rib is L, wherein $0.5\sigma \leq L < \sigma$, and $\sigma$ is a width of an air gap between the stator and the rotor core;
    wherein a ratio of a sum of a total width of all of the slit grooves in a q-axis and a width of the independent filling groove in the q-axis to an effective core width in a radial direction of the rotor core is Q1, wherein $0.35 \leq Q1 \leq 0.5$; and
    wherein the plurality of independent filling grooves are disposed at intervals in a peripheral direction of the rotor core, and occupy a central angle $\alpha$ of the rotor core, wherein $0.1\tau \leq \alpha \leq 0.4\tau$, wherein $\tau$ is a pole pitch angle, $\tau = 180°/p$, and p is a number of pole-pairs.

16. The direct starting synchronous reluctance motor rotor according to claim 1, wherein a first reinforcing rib is disposed between the filling groove and the slit groove in a same magnetic barrier layer, and a second reinforcing rib is disposed between the filling groove and an outer edge of the rotor core.

17. The direct starting synchronous reluctance motor rotor according to claim 16, wherein a width of at least one of the first reinforcing rib and the second reinforcing rib is L4, wherein $0.80\sigma \leq L4 \leq 3\sigma$.

18. The direct starting synchronous reluctance motor rotor according to claim 1, wherein there are at least two of the magnetic barrier layers formed by the slit grooves and the filling grooves at both ends thereof.

19. A motor, comprising the direct starting synchronous reluctance motor rotor according to claim 1.

* * * * *